(12) United States Patent
Ueda (10) Patent No.: US 8,553,062 B2
(45) Date of Patent: Oct. 8, 2013

(54) OPTICAL SCANNER AND IMAGE FORMING APPARATUS

(75) Inventor: Atsushi Ueda, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 194 days.

(21) Appl. No.: 13/102,121

(22) Filed: May 6, 2011

(65) Prior Publication Data

US 2011/0279624 A1 Nov. 17, 2011

(30) Foreign Application Priority Data

May 14, 2010 (JP) ................................. 2010-112109

(51) Int. Cl.
*B41J 27/00* (2006.01)
*B41J 15/14* (2006.01)
*B41J 2/435* (2006.01)

(52) U.S. Cl.
USPC ........... 347/257; 347/242; 347/245; 347/258; 347/263

(58) Field of Classification Search
USPC .................... 347/242, 245, 257, 263
See application file for complete search history.

(56) References Cited

U.S. PATENT DOCUMENTS

| | | | | |
|---|---|---|---|---|
| 5,084,715 A * | 1/1992 | Mama | ............................ | 347/259 |
| 5,218,413 A * | 6/1993 | Kanai | ............................ | 347/226 |
| 5,444,520 A * | 8/1995 | Murano | ........................ | 399/221 |
| 6,219,082 B1 * | 4/2001 | Rumsey et al. | ............... | 347/242 |
| 6,232,991 B1 * | 5/2001 | Appel | ............................ | 347/137 |
| 6,496,215 B2 * | 12/2002 | Wilson | ........................... | 347/256 |
| 6,731,419 B2 * | 5/2004 | Koreeda | ..................... | 359/210.1 |
| 6,791,595 B1 * | 9/2004 | Rauch | ............................ | 347/242 |
| 7,388,191 B2 * | 6/2008 | Bang | .............................. | 250/234 |
| 7,443,556 B2 * | 10/2008 | Serizawa | ................... | 359/205.1 |
| 7,453,615 B2 * | 11/2008 | Nakajima | ................... | 359/198.1 |
| 7,646,520 B2 * | 1/2010 | Funaki et al. | .............. | 359/205.1 |
| 7,684,100 B2 | 3/2010 | Amada | | |
| 7,800,641 B2 * | 9/2010 | Kubo et al. | .................... | 347/245 |
| 8,018,637 B2 * | 9/2011 | Ichii | ............................ | 359/205.1 |
| 8,270,053 B2 * | 9/2012 | Amada et al. | .............. | 359/205.1 |
| 2004/0179087 A1 * | 9/2004 | Yoshizawa et al. | ........... | 347/232 |
| 2006/0238845 A1 | 10/2006 | Atsuumi et al. | | |
| 2007/0098460 A1 * | 5/2007 | Serizawa | ...................... | 399/284 |

FOREIGN PATENT DOCUMENTS

| | | | | |
|---|---|---|---|---|
| JP | 10268217 A | * | 10/1998 | |
| JP | 2000180773 A | * | 6/2000 | |
| JP | 2001166235 A | * | 6/2001 | |
| JP | 2002148551 A | * | 5/2002 | |
| JP | 2002277792 A | * | 9/2002 | |
| JP | 2006-184526 A | | 7/2006 | |
| JP | 2006-323356 A | | 11/2006 | |
| JP | 2007-065500 A | | 3/2007 | |

* cited by examiner

*Primary Examiner* — Laura Martin
*Assistant Examiner* — Jeremy Bishop
(74) *Attorney, Agent, or Firm* — Renner, Otto, Boisselle & Sklar, LLP (57) ABSTRACT

An optical scanner includes a third f-theta lens, an eccentric cam, an attaching portion, a first supporting member, a second supporting member and a spring. A distance between a face opposed to the first side-face of the third f-theta lens in the first supporting member and a face opposed to the second side-face of the third f-theta lens in the second supporting member is set to be longer than a distance of the third f-theta lens in its lateral direction. The spring is disposed opposed to the first side-face or the second side-face, and presses the third f-theta lens so that the third f-theta lens is in contact with the eccentric cam and either of the first supporting member and the second supporting member.

5 Claims, 12 Drawing Sheets

OPTICAL SCANNER AND IMAGE FORMING APPARATUS

CROSS REFERENCE

This Nonprovisional application claims priority under 35 U.S.C. §119(a) on Patent Application No. 2010-112109 filed in Japan on May 14, 2010 the entire contents of which are hereby incorporated by reference.

BACKGROUND OF THE INVENTION

The present invention relates to an optical scanner that allows an adjustment for compensating a scan line bow from either side of an optical element, and to an image forming apparatus provided with the optical scanner.

In electrophotographic image forming apparatus, an electrostatic latent image is formed using an optical scanner to cause a scan line to irradiate a photo conductor. In the optical scanner, a plurality of optical elements (f-theta lenses) are equipped; and the scan line, after transmitting the plurality of the f-theta lenses, arrives on the photo conductor.

Therefore, in order for a scan line to irradiate accurately a predetermined position on the photo conductor, it is required for the f-theta lenses to be capable of transmitting the scan line in high accuracy.

However, there has been a problem that scan line bow occurs when the scan line transmits the f-theta lens because internal structure thereof changes in cooling process after it was molded.

Then, a technique has been disclosed in which adjusting screws are provided at three places in total along the longitudinal direction of the f-theta lenses including the neighborhood of its middle point, thereby allowing an adjustment on push-in depth of each of the screws in order to deform the f-theta lenses in such a manner that the scan line bow is reduced (for example, refer to Japanese Patent Unexamined Publication No. 2007-065500 bulletin).

However, the technique as described in the Japanese Patent Unexamined Publication No. 2007-065500 bulletin can deform the f-theta lens only from a single side thereof. Therefore, in a case where a scan line bow cannot be reduced unless the side is opposite to the side where adjusting screws are disposed is pressed, it was necessary for the f-theta lens to be removed from a holder, to be caused to make a half-turn, and then to be mounted on the holder once again.

Then, in view of the problem as described above, the present invention is directed to providing an optical scanner that allows an adjustment to a scan line bow from either face side of an optical element.

SUMMARY OF THE INVENTION

An optical scanner of the present invention comprises an optical element, a pressing member, an attaching portion, a first supporting member, a second supporting member and an elastic member. The optical element, having a first side-face that is parallel to a longitudinal direction of the optical element and a second side-face that is opposed to the first side face, is disposed within an optical path extending from a light source to a photo conductor, and is adjustable so that a light emitted from the light source irradiates a predetermined position on the photo conductor. The pressing member is a member to press the first side-face or the second side-face, and is disposed so as to be mountable selectively opposed to either the first side-face or the second side-face. The attaching portion is disposed opposed to each of the first side-face and the second side-face in order to mount a pressing member. The first supporting member is disposed opposed to the first side-face.

The second supporting member is disposed opposed to the second side-face. The elastic member is disposed opposed to either the first side-face or the second side-face, and presses the optical element so that the optical element is in contact with the pressing member and either of the first supporting member and the second supporting member.

When the pressing member is disposed opposed to the second side-face, the first supporting member restrains the optical element from being caused to move in a lateral direction of the optical element by a pressing force from the pressing member. When the pressing member is disposed opposed to the first side-face, the second supporting member restrains the optical element from being caused to move in a lateral direction of the optical element by a pressing force from the pressing member. A distance between a face opposed to the first side-face in the first supporting member and a face opposed to the second side-face in the second supporting member is set to be longer than a distance of the optical element in the lateral direction thereof.

With this configuration, because a scan line bow can be adjusted from either face side of the optical element, whatever scan line bow that may occur can be reduced without assembling the optical element once again. It is therefore made possible to reduce the number of steps in production line, so that a final yield rate can be improved.

Also with the configuration, an optical element can easily be inserted between the first supporting member and the second supporting member. Accordingly, because an optical element will not come into contact with the first supporting member or the second supporting member when the optical element is inserted between the first supporting member and the second supporting member, the optical element can be prevented from suffering a chipping failure or a dent failure, thereby resulting in an increased final yield rate.

Furthermore, with the configuration, a position of the optical element in the lateral direction thereof can be fixed.

Thus, wobble of the optical element will not occur whether the optical element is pressed at its either face, or even not pressed at all. Therefore, drift of an optical axis due to the wobble of the optical element can be prevented.

DETAILED DESCRIPTION OF THE INVENTION

An optical scanner according to an embodiment of the present invention is explained below in detail referring to the drawings.

First, a first embodiment of the present invention is explained.

Figure 1:
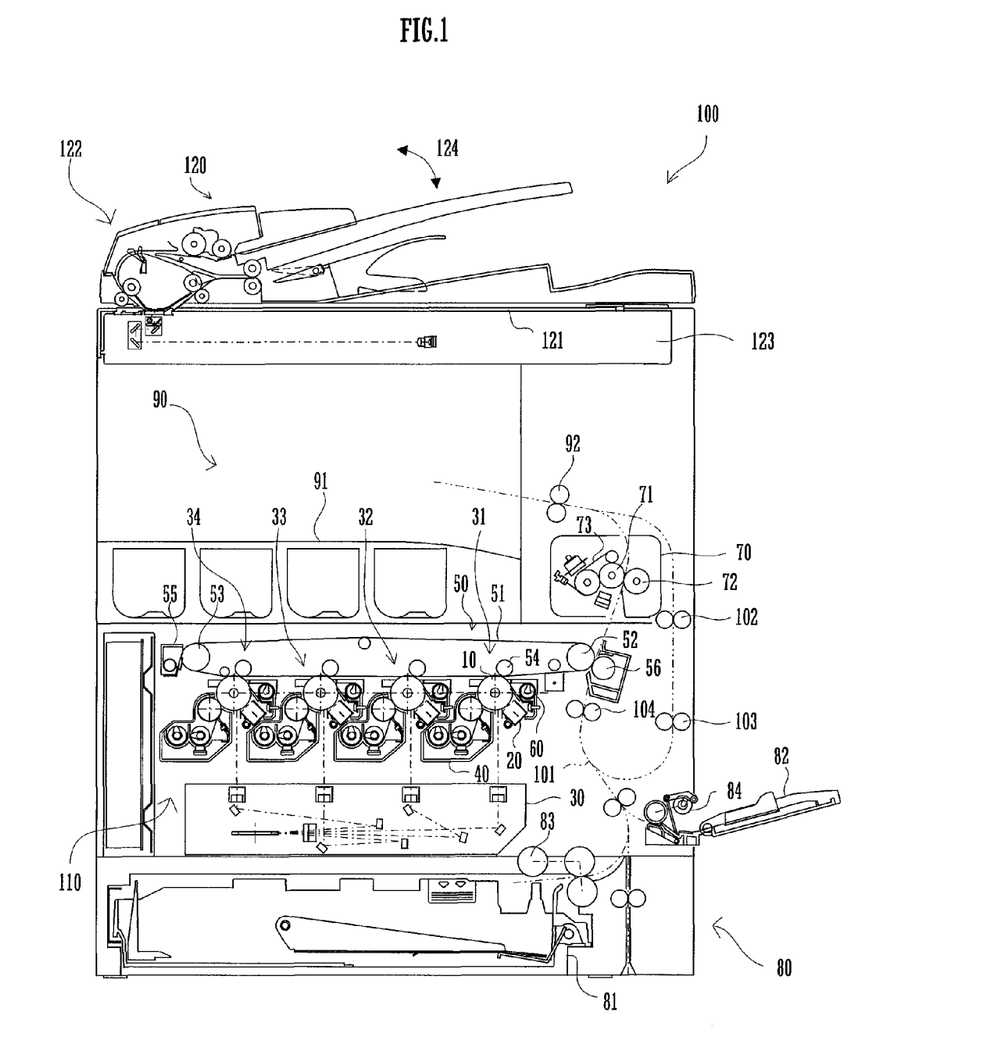
FIG. 1 is a drawing showing a configuration of an image forming apparatus provided with an optical scanner according to a first embodiment of the present invention.

FIG. 1 is a drawing showing a configuration of an image forming apparatus 100 provided with an optical scanner 30 according to a first embodiment of the present invention.

The image forming apparatus 100 is one that forms a multicolored or a monochromatic image onto a predetermined sheet (recording paper) based on image data that have been transmitted from outside. The image forming apparatus 100 is composed of a document processing unit 120, a paper supply section 80, an image forming section 110 and a paper discharge section 90.

The document processing unit 120 includes a document loading table 121, a document conveying equipment 122 and a document reading section 123. The document loading table 121 is made of a transparent glass, and is configured such that document can be placed thereon. The document conveying equipment 122 conveys, piece by piece, documents that are placed on a document load tray.

The document conveying equipment 122 is also configured so as to be swung freely in the direction of an arrow 124, and is configured so as to enable the document to be placed on the document loading table 121 when upside of the document loading table 121 is open. The document reading section 123 reads a document being conveyed by the document conveying equipment 122, or a document placed on the document loading table 122.

The paper supply section 80 is provided with a paper cassette 81, a hand-fed paper cassette 82, a pickup roller 83 and a pickup roller 84. The paper cassette 81 is a tray to store sheets of a standard size. The hand-fed paper cassette 82 is a tray on which to place sheet(s) of a non-standard size. The pickup roller 83 is installed in close vicinity to an edge of the paper cassette 81, picks up the sheets from the paper cassette 81 piece by piece, and supplies it to the paper conveying path 101. Similarly, the pickup roller 84 is installed in close vicinity to an edge of the hand-fed paper cassette 82, m picks up the sheets from the hand-fed paper cassette 82 piece by piece, and supplies it to the paper conveying path 101.

The image forming section 110 consists of image forming stations 31, 32, 33, 34, an optical scanner 30, an intermediate transcription belt unit 50 and a fuser unit 70. The image forming stations 31, 32, 33, 34 are respectively provided with a photoreceptor drum 10, an electrifier 20, a developing device 40 and a cleaner unit 60, thereby being adapted to color images that use respective colors of black (K), cyan (C), magenta (M) and yellow (Y). On this embodiment, the image forming station 31 is explained.

The photoreceptor drum 10 rotates at the time of image forming, and is the one to carry a developer image. Around the photoreceptor drum 10 are disposed an electrifier 20, an optical scanner 30, a developing device 40, the intermediate transcription belt unit 50, a cleaner unit 60 in this order from upstream side of its rotational direction. The fuser unit 70 is located most downstream in the image forming section 110 and on the conveying path 101.

The electrifier 20 is a charging means to charge a surface of the photoreceptor drum 10 uniformly at a predetermined electrostatic potential; and other than charger type as shown in FIG. 1, an electrifier of contact type such as roller type or brush type is used occasionally.

The optical scanner 30, by exposing, depending on image data inputted, the photoreceptor drum 10 that is charged with electricity, has a function to form, on the surface of the photoreceptor drum 10, an electrostatic latent image corresponding to the image data. The optical scanner 30 is configured as a laser scanning unit (LSU) that includes a laser emitting section and a reflecting mirror and so forth. In the optical scanner 30 are disposed a polygonal mirror that scans a laser beam, and optical components such as lenses and mirrors to lead the laser beam reflected by the polygonal mirror to the photoreceptor drum 10. These optical components are described below. For an optical scanner 30, another method, for example, with the use of EL and/or LED writing head configured in an array-like arrangement of light emitting devices may be employed.

The developing device 40 makes an electrostatic latent image that is formed on the photoreceptor drum 10 a manifest image with a toner.

The intermediate transcription belt unit 50 comprises an intermediate transcription belt 51, an intermediate transcription belt drive roller 52, an intermediate transcription belt idle roller 53, an intermediate transcription roller 54 and an intermediate transcription belt cleaning unit 55.

The intermediate transcription belt drive roller 52, the intermediate transcription belt idle roller 53 and the intermediate transcription roller 54 cause the intermediate transcription belt 51 to pass over them in a tensioned condition and to be rotationally driven. Also, the intermediate transcription roller 54 gives a transcription bias to transcribe a toner image on the photoreceptor drum 10 onto the intermediate transcription belt 51.

The intermediate transcription belt 51 is installed so as to be in contact with the photoreceptor drum 10. Then, by transcribing a toner image formed on the photoreceptor drum 10 onto the intermediate transcription belt 51, the intermediate transcription roller 54 has a function to form the toner image on the intermediate transcription belt 51. The intermediate transcription belt 51 is formed into an endless shape, for example, using a film of around 100 μm-150 μm thick.

Transcription of the toner image from the photoreceptor drum 10 onto the intermediate transcription belt 51 is carried out by the intermediate transcription roller 54 that is in contact with backside of the intermediate transcription belt 51. To the intermediate transcription roller 54, in order to transcribe the toner image, a high-voltage transcription bias (a high voltage of reverse polarity (+) to the electrostatic charge polarity (−) of the toner) is applied. The intermediate transcription roller 54 is a roller that is formed using a shaft made of metal (e.g., stainless steel) with a diameter of 8-10 mm as a base material and covering the surface thereof with an electrically-conductive elastomer (e.g., EPDM, urethane foam or the like). The electrically-conductive elastomer makes it possible to apply a high voltage uniformly to the intermediate transcription belt 41.

Although roller geometry is used as a transcription electrode in this embodiment, a brush or the like may be used otherwise.

The electrostatic latent image that has been made a manifest image on the photoreceptor drum 10 as described above is superimposed on the intermediate transcription belt 51. The image information that was superimposed in this manner is transcribed onto paper by a transcription roller 56 disposed at a location where the paper comes into contact with the intermediate transcription belt 51 as the intermediate transcription belt 51 rotates.

At this time, the intermediate transcription belt 51 and the transcription roller 56 are caused to be in contact with each other with a predetermined nip pressure, and a voltage to cause the toner image to be transcribed onto paper (a high voltage of reverse polarity (+) to the electrostatic charge polarity (−) of the toner) is applied to the transcription roller 56. Further, in order to constantly maintain the above described nip pressure, either of the transcription roller 56 and the intermediate transcription belt drive roller 52 is made of a rigid material (metal, etc.), then to the other an elastic roller made of a flexible material or the like (elastic rubber roller or foam resin roller, etc.) is employed.

Also, the intermediate transcription belt cleaning unit 55 is set up so as to remove and collect the toner which adhered to the intermediate transcription belt 51 through its contact with the photoreceptor drum 10 as described above and which remains on the intermediate transcription belt 51 after the transcription was carried out onto paper by the transcription roller 56. The intermediate transcription belt cleaning unit 55 is equipped with a cleaning blade, for instance, as a cleaning member that is in contact with the intermediate transcription belt 51; and the intermediate transcription belt 51 with which the cleaning blade is in contact is supported from the backside by the intermediate transcription belt idle roller 53.

The cleaner unit 60 removes and collects the toner which remains on the surface of the photoreceptor drum 10 after the development and image transcription was carried out.

The fuser unit 70 includes a heating roller 71 and a pressure roller 72; and the heating roller 71 and the pressure roller 72 are configured so as to rotate holding the sheet between them. And the heating roller 71 is set to a predetermined fusing temperature by a control section based on the signal from a temperature sensor which is not illustrated, and performs a function of heat fusing on the sheet by means of the thermo-compression bonding of the toner to the sheet in cooperation with the pressure roller 72, and thus through fusing, mixing and pressure-contacting the toner image that was transcribed onto the sheet. Also, an external heating belt 73 is provided for heating the heating roller 71 from outside.

The paper discharge section 90 is provided with a paper discharge tray 91 and a paper discharge roller 92. The paper that has passed the fuser unit 70, passing through the paper discharge roller 92, is discharged onto the paper discharge tray 91. The paper discharge tray 91 is a tray to accumulate the sheet having undergone printing.

Additionally, in the case of duplex printing, rotational direction of the paper discharge roller 92 is reversed when the paper that has undergone a single sided printing and has passed through the fuser unit 70 as described above is held at the rear edge thereof by the paper discharge roller 92, and then the sheet is led to the conveyance rollers 102, 103. Thereafter, having passed through a registration roller 104 and then having undergone a printing on its rear face, the sheet is discharged onto the paper discharge tray 91.

Figure 2:
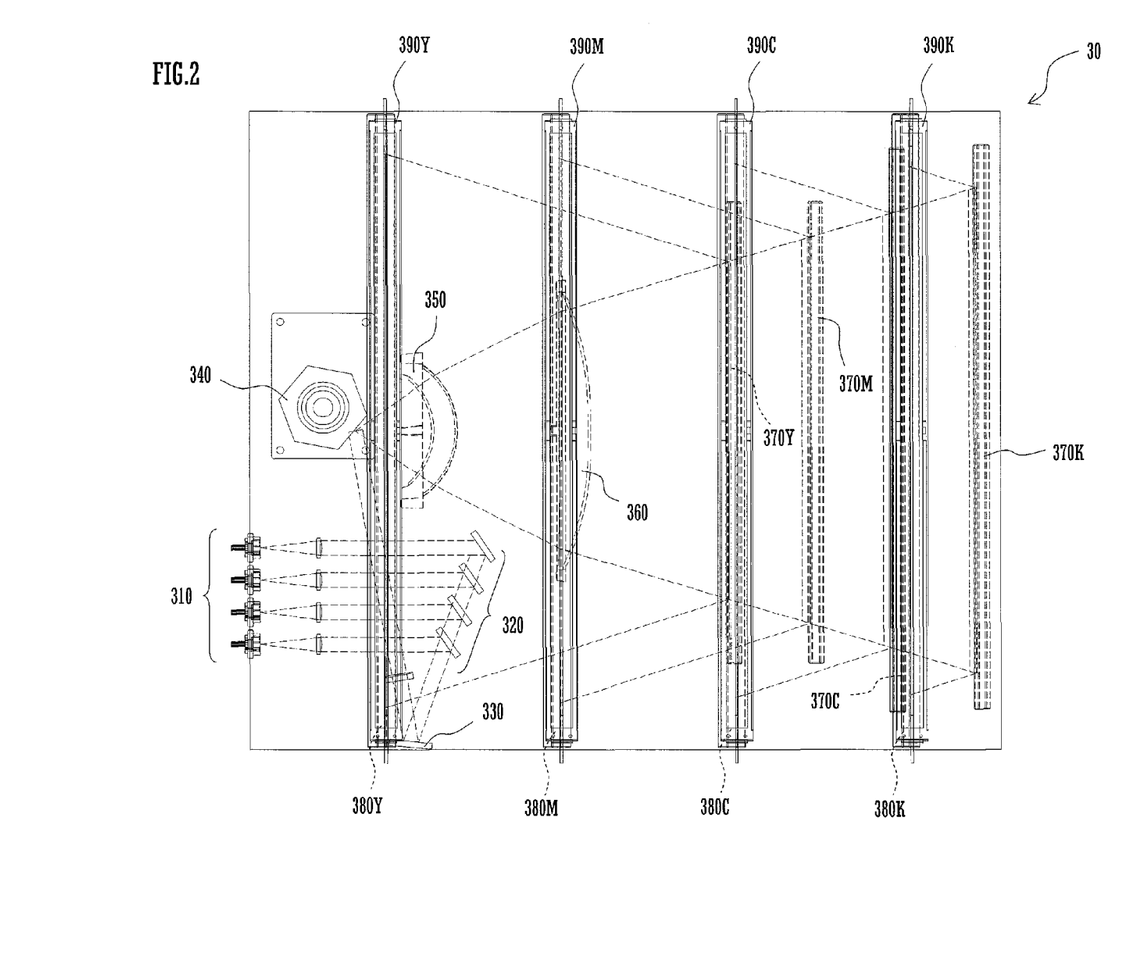
FIG. 2 is a top view showing a configuration of the optical scanner according to the first embodiment of the present invention.
Figure 3:
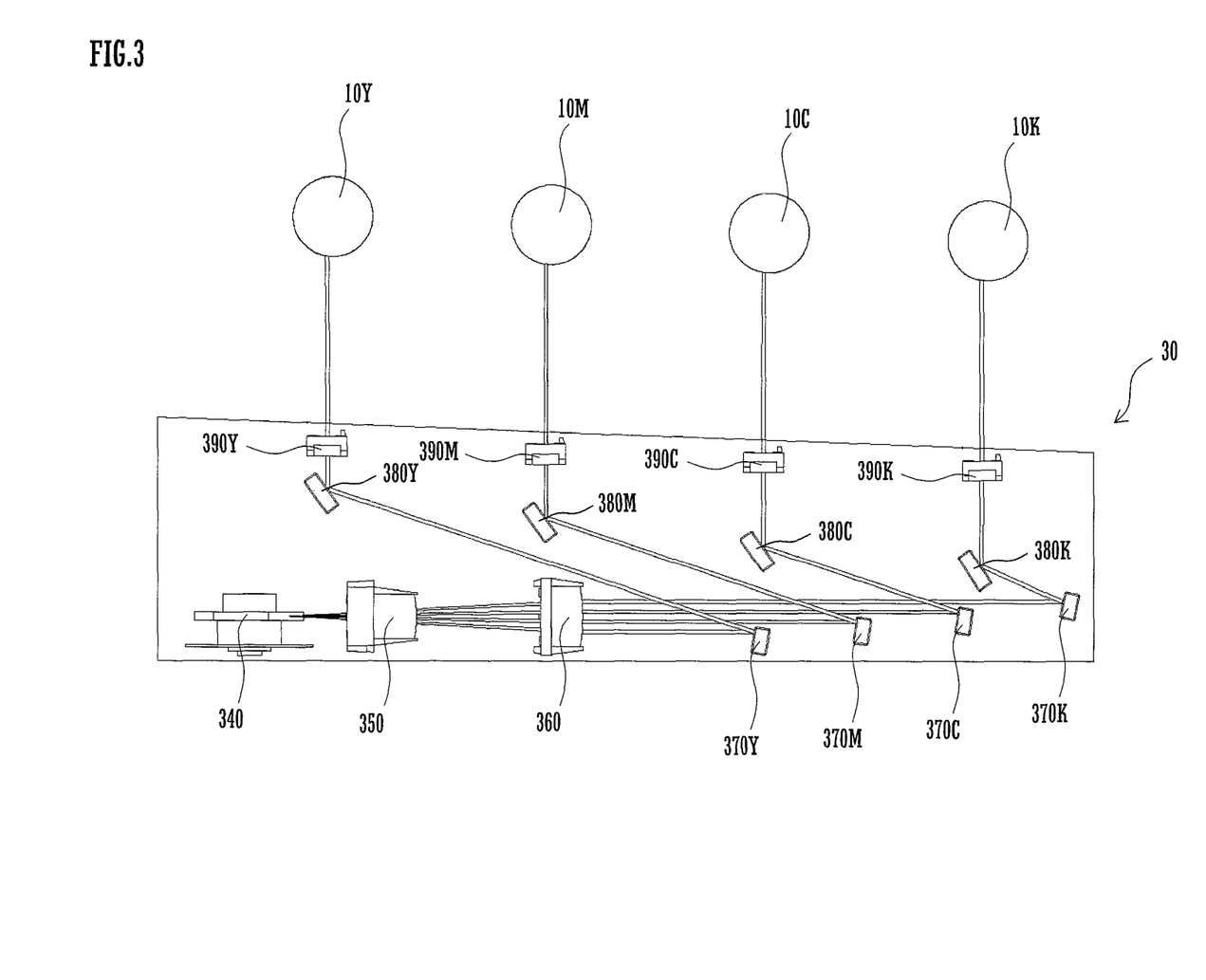
FIG. 3 is a side view showing the configuration of the optical scanner according to the first embodiment of the present is invention.
Figure 4:
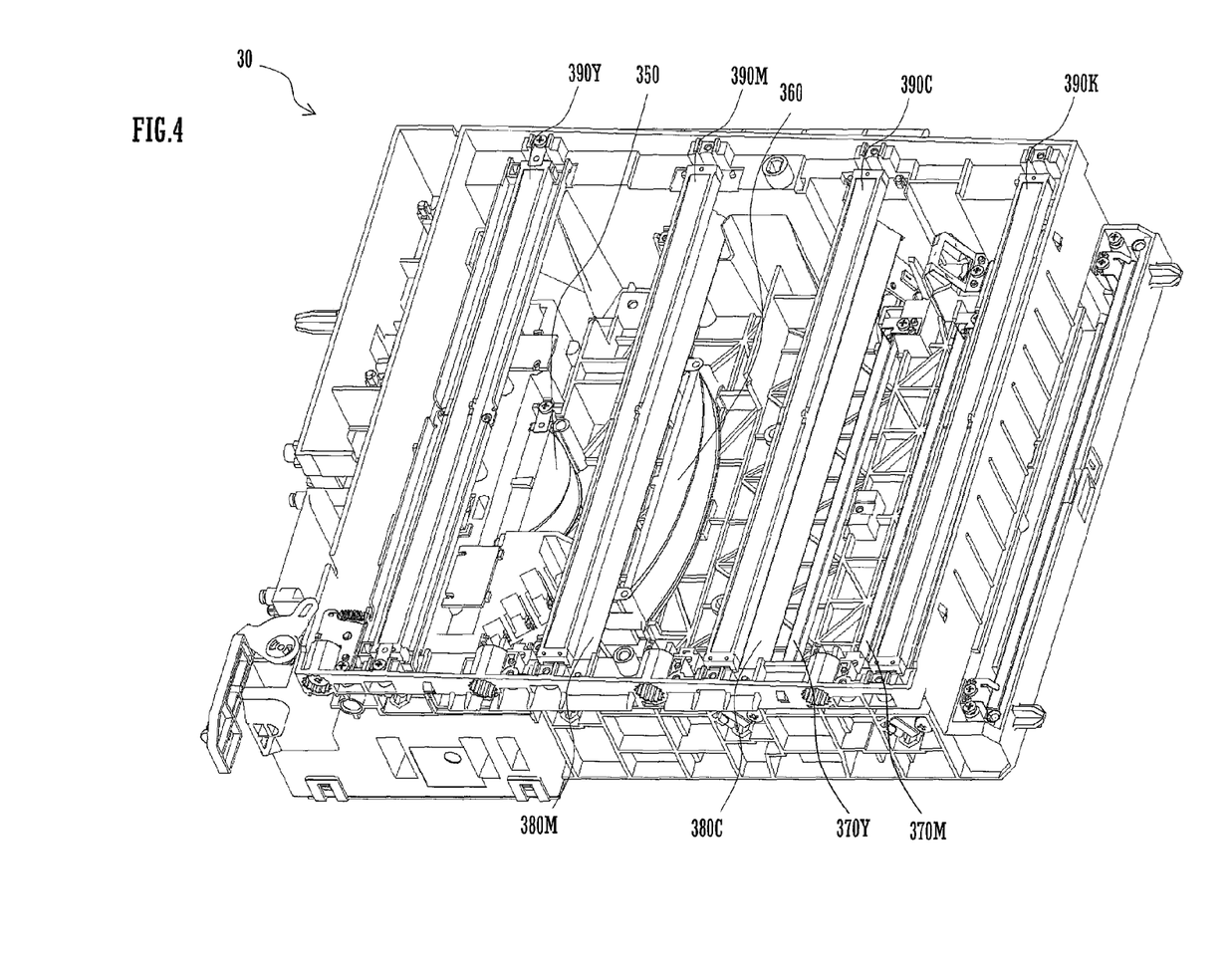
FIG. 4 is a perspective view showing the configuration of the optical scanner according to the first embodiment of the present invention.

FIG. 2 is a top view showing a configuration of the optical scanner 30 according to the first embodiment of the present invention. FIG. 3 is a side view showing the configuration of the optical scanner 30 according to the first embodiment of the present invention. FIG. 4 is a perspective view showing the configuration of the optical scanner 30 according to the first embodiment of the present invention.

The optical scanner 30 comprises a laser diode 310, a mirror 320, a mirror 330, a polygonal mirror 340, a first f-theta lens 350, a second f-theta lens 360, a mirror 370, a mirror 380 and a third f-theta lens 390. The third f-theta lens 390 corresponds to an optical element of the present invention. In FIG. 2-FIG. 4, the signs Y, M, C and K that are given to each of the mirrors 370, the mirrors 380 and the third f-theta lenses 390 show that they correspond to yellow (10Y), magenta (10M), cyan (100) and black (10K) in the photoreceptor drums 10.

The laser diode 310 emits laser beams corresponding to the respective colors of yellow, magenta, cyan and black. The mirror 320 reflects, toward the mirror 330, the laser beams that were emitted from the laser diode 310. The mirror 330 reflects, toward the polygonal mirror 340, the laser beams that were reflected by the mirror 320.

The polygonal mirror 340 is a regular polygonal column in shape, and it is rotationally driven in high speed at the time of image forming; and while reflecting, by mirrors on its respective faces, the laser beams that were reflected by the mirror 330, it performs a constant angular velocity scan of the laser beams in a primary scanning direction. The first f-theta lens 350 and the second f-theta lens 360 have a function to convert a primary scan rate of the laser beams so that the laser beams that have undergone a constant angular velocity scan on the polygonal mirror 340 undergo a constant velocity scan on the photo conductor 10. The first f-theta lens 350 and the second f-theta lens 360 also have a function to narrow down a diameter of the primary scanning direction of each laser beam.

The mirror 370 reflects, toward the mirror 380, the laser beam that transmitted the first f-theta lens 350 and the second f-theta lens 360. The mirror 380 reflects, toward the third f-theta lens, the laser beam that was reflected by the mirror 370. The third f-theta lens 390 has a function to carry out an adjustment to make sure that the laser beam reflected by the mirror 380 irradiates a predetermined position on the photoreceptor drum 10. The third f-theta lens 390 also has a function to narrow down a diameter of a secondary scanning direction of the laser beam.

Figure 5:
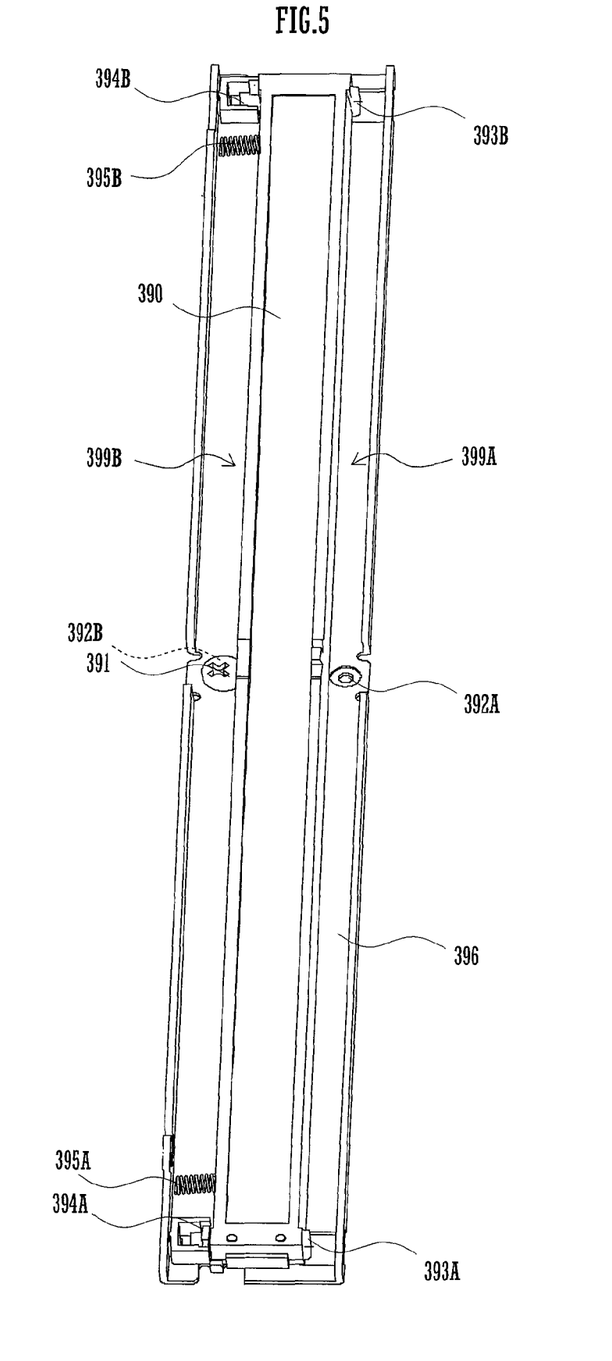
FIG. 5 is a drawing showing an essential part of the configuration of the optical scanner according to the first embodiment of the present invention.

FIG. 5 is a drawing showing an essential part of the configuration of the optical scanner 30 according to the first embodiment of the present invention.

The optical scanner 30 comprises the third f-theta lens 390, an eccentric cam 391, attaching portions 392A, 392B, first supporting members 393A, 393B, second supporting members 394A, 394B, springs 395A, 395B and a holder 396. In this embodiment, the holder 396 is made of sheet metal. The eccentric cam 391 corresponds to a pressing member of the present invention. The springs 395A, 395B correspond to elastic members of the present invention.

The third f-theta lens 390 is disposed in an optical path extending from the laser diode 310 to the photoreceptor drum 10, and has a first side-face 399A that is parallel to a longitudinal direction of the third f-theta lens 390 and a second side-face 399B that is opposed to the first side-face 399A. The eccentric cam 391, which is a member to press the first side-face 399A or the second side-face 399B, is disposed so as to be mountable selectively opposed to either the first side-face 399A or the second side-face 399B. The attaching portions 392A, 392B are respectively disposed opposed to the first side-face 399A and the second side-face 399B to mount the eccentric cam 391. The Attaching portions 392A, 392B are threaded holes provided to the holder 396.

In FIG. 5, a situation in which the eccentric cam 391 is mounted on the attaching portion 392B is shown. The eccentric cam 391 has a side at which it is to be mounted on the attaching portions 392A, 392B that is formed in a shape of a screw, and is thereby configured so as to be capable of making a threaded engagement with the attaching portions 392A, 392B. With its rotatory state, the eccentric cam 391 makes it possible to adjust the pressing force to the third f-theta lens 390. In order to alter the rotatory state of the eccentric cam 391, it is enough to turn a crosshead screwdriver being engaged in a cruciate groove formed on a head of the eccentric cam 391. Being mounted on the attaching portion 392A or the attaching portion 392B, the eccentric cam 391 can press the third f-theta lens 390 from either face side.

With this configuration, because a scan line bow can be adjusted from either face side of the third f-theta lens 390, whatever scan line bow that may occur can be reduced without assembling the third f-theta lens 390 into the holder 396 once again. It is therefore made possible to reduce the number of steps in production line, so that a final yield rate can be improved.

The first supporting members 393A, 393B are disposed opposed to the first side-face 399A. Also, when the eccentric cam 391 is disposed opposed to the second side-face 399B, the first supporting members 393A, 393B restrain the third f-theta lens 390 from being caused to move in a lateral direction of the third f-theta lens 390 by a pressing force from the eccentric cam 391. The second supporting members 394A, 394B are disposed opposed to the second side-face 393B. Also, when the eccentric cam 391 is disposed opposed to the first side-face 399A, the second supporting members 394A, 394B restrain the third f-theta lens 390 from being caused to move in a lateral direction of the third f-theta lens 390 by a pressing force from the eccentric cam 391.

The first supporting members 393A, 393B are formed by bending the holder 396. The second supporting members 394A, 394B are formed of a resin. Or otherwise, the first supporting members 393A, 393B may be formed of a resin, and the second supporting members 394A, 394B may be formed by bending the holder 396.

With the first supporting members 393A, 393B and the second supporting members 394A, 394B being disposed, the third f-theta lens 390 is fixed in position in a state of its being pressed by the eccentric cam 391.

Being disposed opposed to the first side-face 399A or the second side-face 399B, the springs 395A, 395B press the third f-theta lens 390 so that the third f-theta lens 390 is in contact with any one of the eccentric cam 391, the first supporting members 393A, 393B, and the second supporting members 394A, 394B. Thus, the springs 395A, 395B can fix the position of the third f-theta lens 390 in the lateral direction thereof.

Therefore, wobble of the third f-theta lens 390 will not occur whether the third f-theta lens 390 is pressed at its either face, or even not pressed at all. Accordingly, drift of an optical axis due to the wobble of the third f-theta lens 390 can be prevented.

The holder 396 holds unitedly the third f-theta lens 390, the eccentric cam 391, the first supporting members 393A, 393B, the second supporting members 394A, 394B and the springs 395A, 395B.

Figure 6:
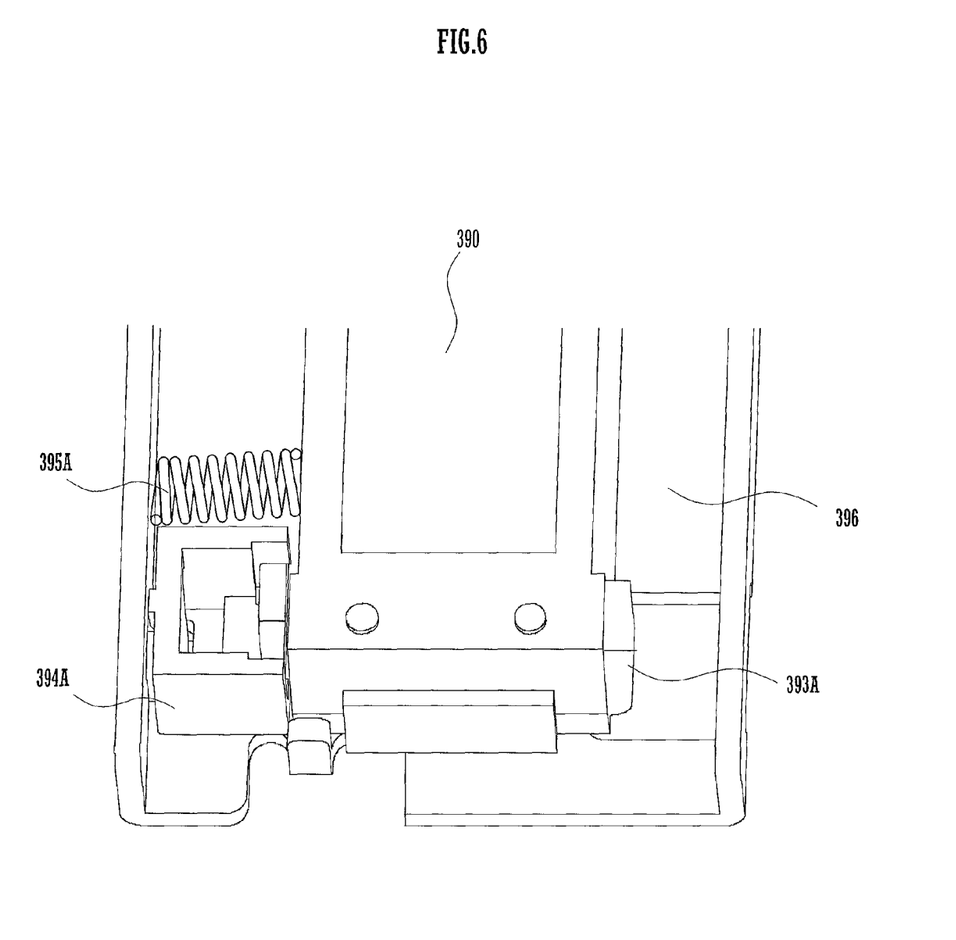
FIG. 6 is an enlarged view of elements of the essential part of the configuration of the optical scanner according to the first embodiment of the present invention.

FIG. 6 is an enlarged view of elements of the essential part of the configuration of the optical scanner 30 according to the first embodiment of the present invention.

In FIG. 6, only an enlarged front portion of FIG. 5 is shown. As shown in FIG. 6, a gap is formed between the third f-theta lens 390 and the second supporting member 394A. The gap is around 0.1 mm. The same applies to the relationship between the third f-theta lens 390 and the second supporting member 394B.

That is to say, a distance between a face opposed to the first side-face 399A in each of the first supporting members 393A, 393B and a face opposed to the second side-face 399B in each of the second supporting members 394A, 394B is set to be longer than a distance of the third f-theta lens in the lateral direction thereof. The reason why the first supporting members 393A, 393B and the second supporting members 394A, 394B are disposed in this manner is to make it possible to assemble the third f-theta lens 390 easily in the holder 396. Then the spring 395A is disposed in close proximity to the second supporting member 394A. The spring 395A presses the third f-theta lens 390 so that the third f-theta lens 390 is in contact with the first supporting member 393A. A gap is formed therefore between the third f-theta lens 390 and the second supporting member 394A. Likewise, the spring 395B is disposed in close proximity to the second supporting member 394B. The spring 395B presses the third f-theta lens 390 so that the third f-theta lens 390 is in contact with the first supporting member 393B. A gap is formed therefore between the third f-theta lens 390 and the second supporting member 394B.

With this configuration, the third f-theta lens 390 can easily be inserted between the first supporting members 393A, 393B and the second supporting members 394A, 394B.

Secondly, a second embodiment of the present invention is explained. In each embodiment from the second embodiment onwards, details that have already been explained in the first embodiment and would be duplicated otherwise are omitted.

Figure 7:
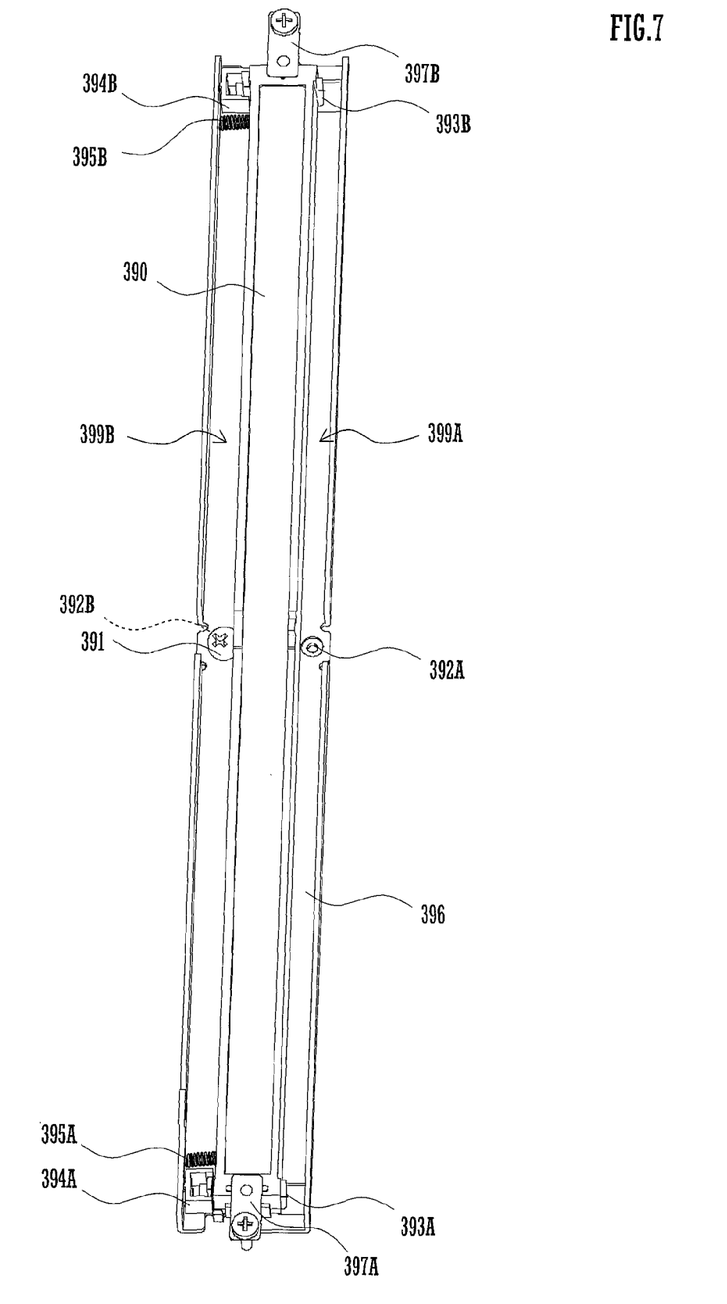
FIG. 7 is a drawing showing an essential part of a configuration of an optical scanner according to a second embodiment of the present invention.

FIG. 7 is a drawing showing an essential part of a configuration of an optical scanner 30 according to a second embodiment of the present invention.

This embodiment, in addition to the configuration of the first embodiment, further comprises third supporting members 397A, 397B that restrain a vertically upward movement of the third f-theta lens 390 at both longitudinal ends of the third f-theta lens 390.

The holder 396 holds the third supporting members 397A, 397B unitedly, in addition to the third f-theta lens 390, the eccentric cam 391, the first supporting members 393A, 393B, the second supporting members 394A, 394B and the springs 395A, 395B. Also, the holder 396 of the present embodiment is configured so as to be attachable to and detachable from the optical scanner 30.

Accordingly, this enables the holder 396 and all members that are held on the holder 396 to be treated as a single unit, m so that the amount of deformation of the third f-theta lens 390 can be adjusted with the unit removed from the optical scanner 30; therefore, a scan line bow can easily be reduced.

Figure 8:
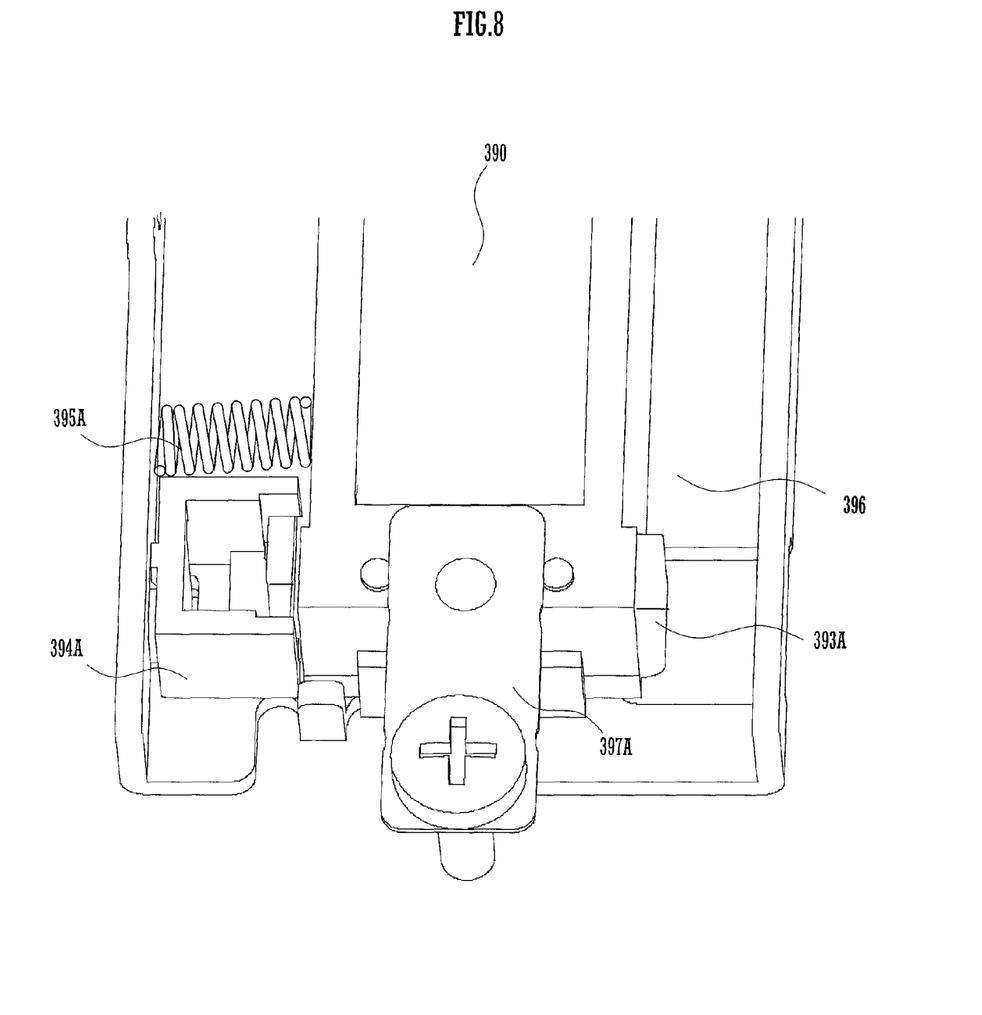
FIG. 8 is an enlarged view of elements of the essential part of the configuration of the optical scanner according to the second embodiment of the present invention.

FIG. 8 is an enlarged view of elements of the essential part of the configuration of the optical scanner 30 according to the second embodiment of the present invention.

In FIG. 8, only an enlarged front portion of FIG. 7 is shown. The third supporting member 397A is screwed down at its one end, and its free end on the opposite side presses the third f-theta lens 390 toward a direction in which the third f-theta lens 390 is mounted on the holder 396. A configuration of the third supporting member 397B is likewise, also. Therefore, the third f-theta lens 390 can be prevented from wobbling vertically upward.

Also, it is preferred that the third supporting members 397A, 397B are formed of an elastic material. In this case, for example, even when an intense impulse acts vertically upward on the third f-theta lens 390, the third supporting members 397A, 397B absorb the impulse; so that neither are the third f-theta lens 390 and the third supporting members 397A, 397B damaged between each other, nor does the third f-theta lens 390 move vertically upward. Consequently, because displacement of the third f-theta lens 390 will not occur, the optical axis thereof can be prevented from drifting.

Further, although a compression spring is applied to each of the springs 395A, 395B in the first embodiment and the second embodiment, application is not limited as such. For instance, a flat spring can be used.

Also, in the first embodiment and the second embodiment, the spring 395A is disposed in close vicinity to the second supporting member 394A, and the spring 395B is disposed in close vicinity to the second supporting member 394B; however, configuration is not limited as such. A configuration may be such that the spring 395A is disposed in close vicinity to the first supporting member 393A and that the spring 395B is disposed in close vicinity to the first supporting member 393B.

Next, a third embodiment of the present invention is explained.

Figure 9:
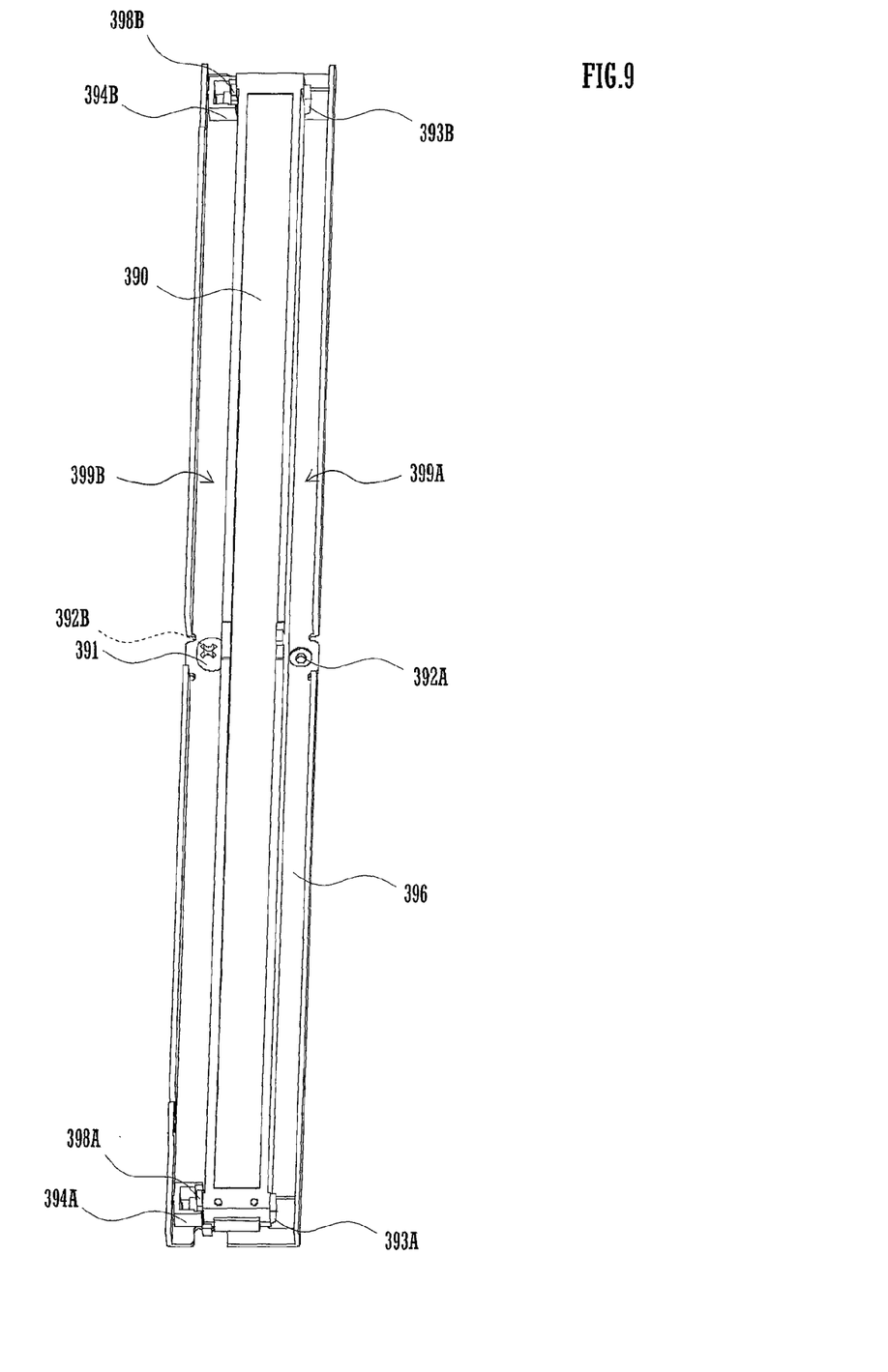
FIG. 9 is a drawing showing an essential part of a configuration of an optical scanner according to a third embodiment of the present invention.

FIG. 9 is a drawing showing an essential part of a configuration of an optical scanner 30 according to a third embodiment of the present invention.

In this embodiment, pressurizing members 398A, 398B are used instead of the springs 395A, 395B. The pressurizing members 398A, 398B are formed of an elastic resin, and have a function similar to that of the springs 395A, 395B.

Figure 10A:
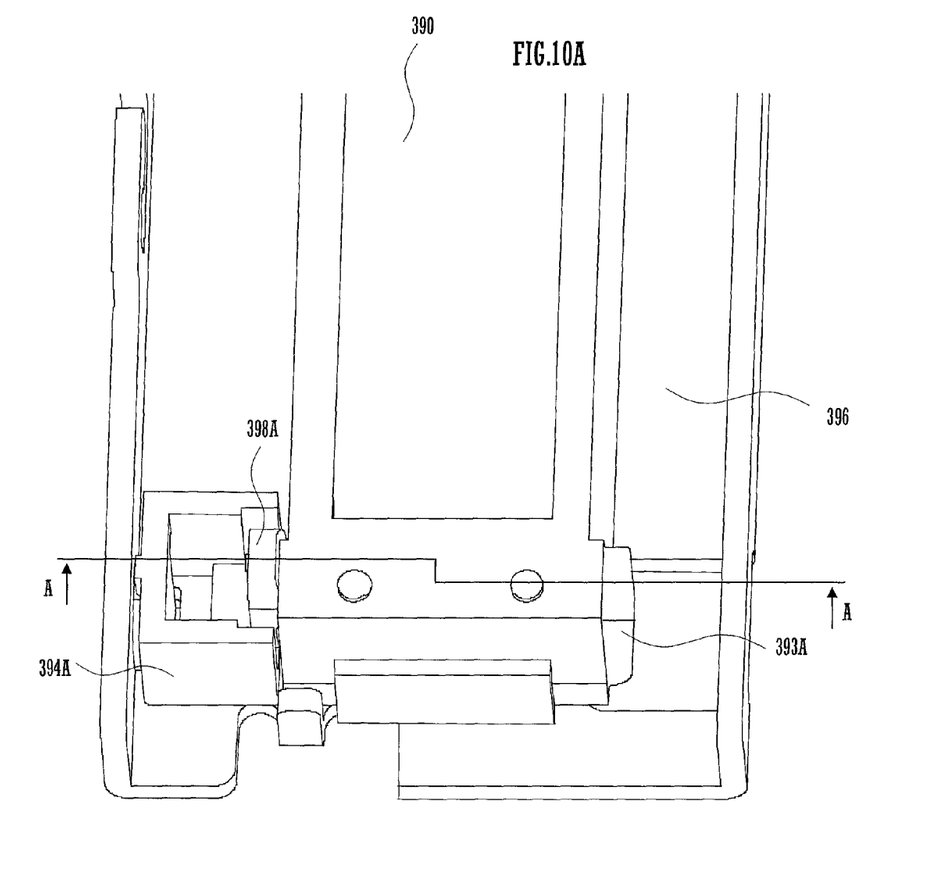
FIG. 10A is an enlarged view of elements of the essential part of the configuration of the optical scanner according to the third embodiment of the present invention.

FIG. 10A is an enlarged view of elements of the essential part of the configuration of the optical scanner 30 according to the third embodiment of the present invention.

In FIG. 10A, only an enlarged front portion of FIG. 9 is shown. In this embodiment, the second supporting member 394A, the pressurizing member 398A, the second supporting member 394B and the pressurizing member 398B are formed into one united body. Consequently, two members can be formed using one metal mold; and thus it is made possible to reduce the number of steps in production line, so that a final yield rate can be improved.

Figure 10B:
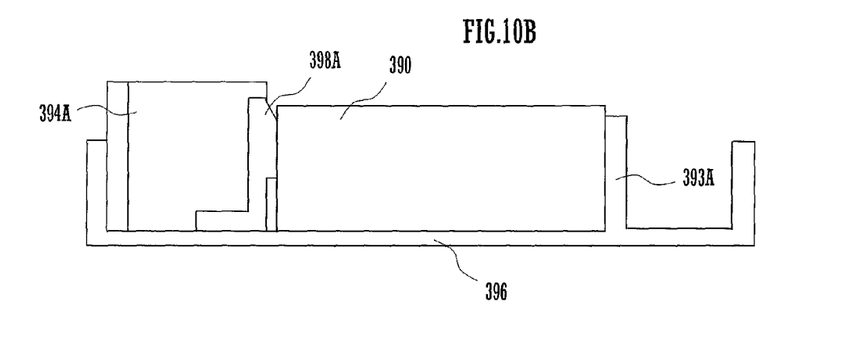
FIG. 10B is a sectional view at A-A of FIG. 10A.

FIG. 10B is a sectional view at A-A of FIG. 10A. As explained in the first embodiment, a gap of around 0.1 mm is formed between the third f-theta lens 390 and the second supporting member 394A.

Therefore, in a case where it is not necessary to press the third f-theta lens 390 by the eccentric cam 391, wobble will occur because a position of the third f-theta lens 390 is not fixed.

Whereas, with the pressurizing member 398A being provided, even in the case where it is not necessary to press the third f-theta lens 390 by the eccentric cam 391, wobble of the third f-theta lens 390 will not occur because the third f-theta lens 390 comes into contacts with the first supporting member 393A in a fixed state. The pressurizing member 398B has an effect similar to that of the pressurizing member 398A.

Besides, the pressurizing member 398A is formed so as to have a slanted edge portion on its top face. This shape makes it easier to insert the third f-theta lens 390. The pressurizing member 398B has a similar shape.

Further, it is preferred that the one united body into which the second supporting members 394A, 394B and the pressurizing members 398A, 398B are formed is made of a polyacetal (POM). Due to its excellent strength, modulus of elasticity and resistance to impact, it is suitable to use polyacetal in this embodiment.

Additionally, although, in this embodiment, the pressurizing member 398A and the second supporting member 394A are formed into one united body while the pressurizing member 398B and the second supporting member 394B are formed into one united body, configuration is not limited as such. A configuration may be such that the pressurizing member 398A and the first supporting member 393A are formed into one united body, and that the pressurizing member 398B and the first supporting member 393B are formed into one united body.

Figure 11:
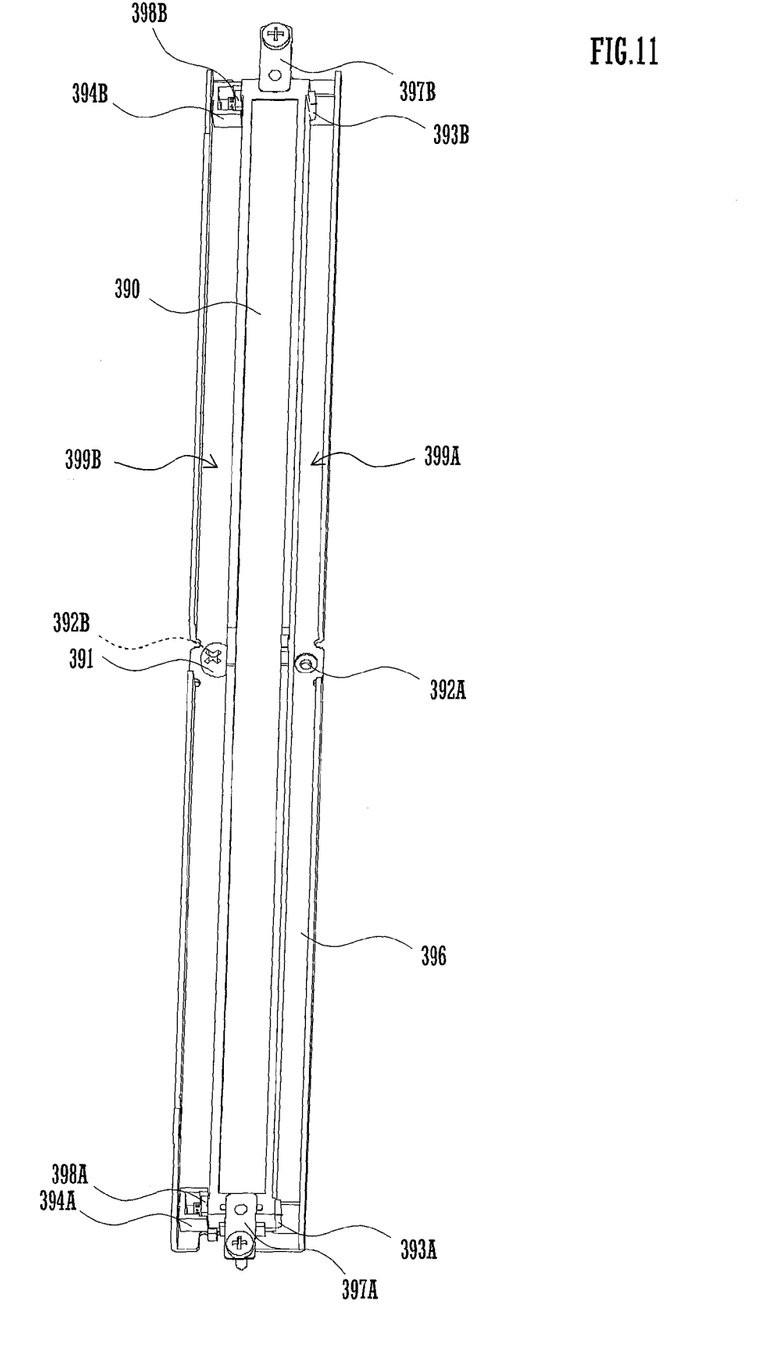
FIG. 11 is a drawing showing an essential part of a configuration of an optical scanner according to a combination of the first through third embodiments of the present invention.
Figure 12:
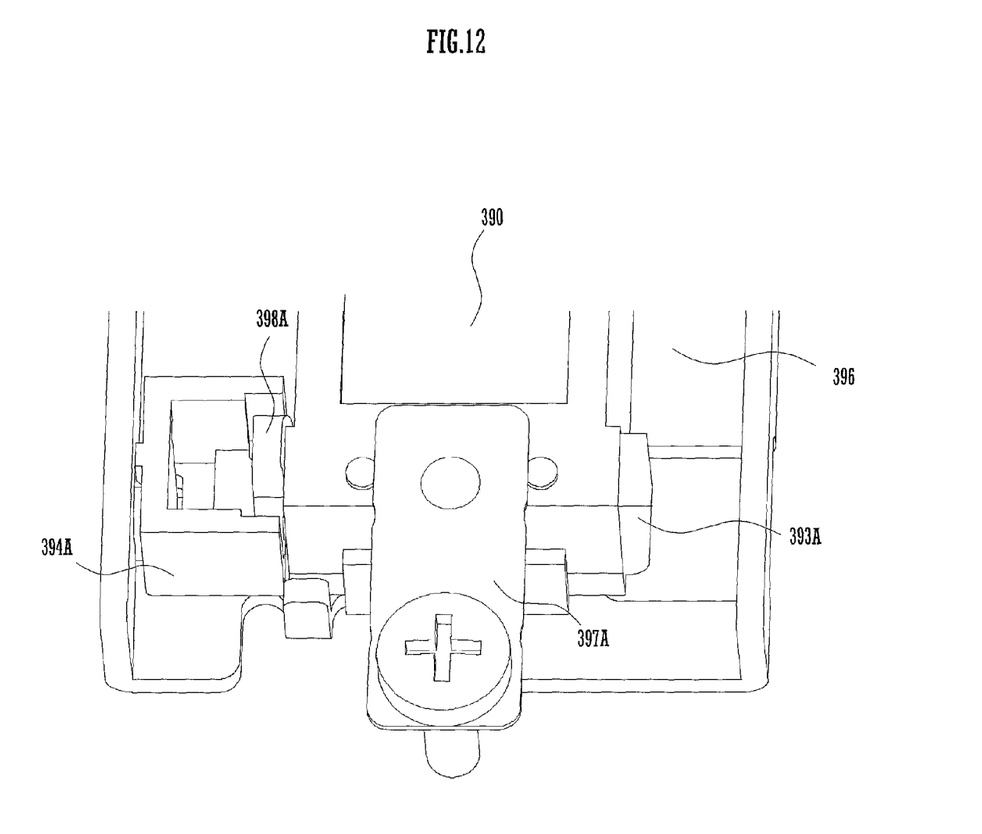
FIG. 12 is an enlarged view of elements of the essential part of the configuration of the optical scanner according to the combination of the first through third embodiments of the present invention.

Also, the configurations in the first embodiment through the third embodiment may arbitrarily be combined. Combination of the configurations may therefore be altered depending on the modes of implementation. For example, as shown in FIG. 11 and FIG. 12, it is possible to combine all the configurations in the first through third embodiments. A combination of the respective embodiments results in yielding a combination of operations and effects of the respective embodiments.

Finally, the above explanation of the embodiments is nothing more than illustrative in any respect, nor should be thought of as restrictive. Scope of the present invention is indicated by claims rather than the above embodiment. Further, it is intended that all changes that are equivalent to a claim in the sense and realm of the doctrine of equivalence be included within the scope of the present invention.

What is claimed is:

1. An optical scanner comprising:
   an optical element disposed in an optical path extending from a light source to a photo conductor for adjusting a light emitted from the light source so as to irradiate a predetermined position on the photo conductor, the optical element having a first side-face that is parallel to a longitudinal direction of the optical element and a second side-face that is opposed to the first side-face;
   an eccentric cam disposed so as to be mountable selectively opposed to either the first side-face or the second side-face for pressing the first side-face or the second side-face;
   an attaching portion that is disposed opposed to each of the first side-face and the second side-face for mounting the eccentric cam thereon;
   a first supporting member disposed opposed to the first side-face;
   a second supporting member disposed opposed to the second side-face; and
   an elastic member that is disposed opposed to either the first side-face or the second side-face and presses the optical element so that the optical element is in contact with any one of the eccentric cam, the first supporting member, and the second supporting member; wherein
   the first supporting member restrains the optical element from being caused to move in a lateral direction of the optical element by a pressing force from the eccentric cam when the eccentric cam is disposed opposed to the second side-face;
   the second supporting member restrains the optical element from being caused to move in a lateral direction of the optical element by a pressing force from the eccentric cam when the eccentric cam is disposed opposed to the first side-face; and wherein
   a distance between a face opposed to the first side-face in the first supporting member and a face opposed to the second side-face in the second supporting member is set to be longer than a distance of the optical element in the lateral direction thereof.

2. The optical scanner as claimed in claim 1 further comprising a third supporting member for restraining a vertically upward movement of the optical element at both longitudinal ends of the optical element.

3. The optical scanner as claimed in claim 2 further comprising a holder that holds unitedly the optical element, the eccentric cam, the first supporting member, the second supporting member, the elastic member and the third supporting member and that is removable from the main body of the optical scanner.

4. The optical scanner as claimed in claim 1 wherein either the first supporting member or the second supporting member, and the elastic member are formed into one united body that is formed of polyacetal.

5. An image forming apparatus comprising:
a photo conductor; and
an optical scanner as claimed in claim 1 wherein the optical scanner causes a scan line that is modulated based on image information to irradiate the photo conductor.

* * * * *